United States Patent
Fruehauf et al.

(10) Patent No.: US 8,590,934 B2
(45) Date of Patent: Nov. 26, 2013

(54) VEHICLE SEAT BELT-OFFERING DEVICE AND THREE-POINT AUTOMATIC BELT

(75) Inventors: Frank Fruehauf, Aichwald (DE); Rolf Pemsel, Nagold (DE); Thomas Siegel, Boeblingen (DE)

(73) Assignee: Daimler AG, Stuttgart (DE)

( * ) Notice: Subject to any disclaimer, the term of this patent is extended or adjusted under 35 U.S.C. 154(b) by 456 days.

(21) Appl. No.: 12/809,960

(22) PCT Filed: Dec. 5, 2008

(86) PCT No.: PCT/EP2008/010327
§ 371 (c)(1),
(2), (4) Date: Sep. 13, 2010

(87) PCT Pub. No.: WO2009/080189
PCT Pub. Date: Jul. 2, 2009

(65) Prior Publication Data
US 2011/0001310 A1 Jan. 6, 2011

(30) Foreign Application Priority Data
Dec. 22, 2007 (DE) .................. 10 2007 062 590

(51) Int. Cl.
*B60R 22/00* (2006.01)
*B60R 22/04* (2006.01)
*A62B 35/00* (2006.01)

(52) U.S. Cl.
USPC ........ 280/801.1; 280/802; 280/808; 297/468; 297/481; 297/483

(58) Field of Classification Search
USPC .............. 280/801.1, 802, 808; 297/468, 469, 297/483, 486, 481
See application file for complete search history.

(56) References Cited

U.S. PATENT DOCUMENTS 3,794,135 A * 2/1974 Ewert et al. .................. 280/802
4,004,829 A * 1/1977 Kato et al. .................... 280/802
4,053,175 A * 10/1977 Kato et al. .................... 280/803

(Continued)

FOREIGN PATENT DOCUMENTS

DE 25 57 316 A1 6/1977
DE 39 09 363 A1 5/1990

(Continued)

OTHER PUBLICATIONS

German Office Action Including partial translation dated Jun. 12, 2008 Nine (9) pages.

(Continued)

*Primary Examiner* — Joseph Rocca
*Assistant Examiner* — Joselynn Y Sliteris
(74) *Attorney, Agent, or Firm* — Crowell & Moring LLP

(57) ABSTRACT

A three-point automatic belt has an offering arm, which is rotatably mounted by means of a drive, for a seat in a vehicle. A rotatably mounted offering arm is designed as a belt strap part, which is stiffened in one plane, of a belt strap, and can be deflected by means of an electromotive drive. The deflectable, stiffened belt strap part can be deflected into a forward end position, in which the belt strap is offered to a vehicle occupant, into an intermediate or boarding position and into a rearward end position in which access to a storage compartment and/or a rear space and/or a rear seat is enabled.

15 Claims, 7 Drawing Sheets

(56) References Cited

U.S. PATENT DOCUMENTS

| | | | | |
|---|---|---|---|---|
| 4,238,129 A | * | 12/1980 | Yasumatsu | 280/802 |
| 4,575,119 A | | 3/1986 | Okuhara et al. | |
| 8,070,185 B2 | * | 12/2011 | Jernstrvm | 280/805 |
| 2006/0119091 A1 | * | 6/2006 | Takao et al. | 280/801.1 |
| 2010/0025976 A1 | * | 2/2010 | Murtha et al. | 280/801.1 |

FOREIGN PATENT DOCUMENTS

| | | |
|---|---|---|
| DE | 100 52 595 A1 | 9/2001 |
| DE | 100 63 583 A1 | 6/2002 |
| DE | 102 55 910 A1 | 6/2004 |
| DE | 10 2004 036 189 A1 | 3/2006 |
| EP | 0 181 160 A2 | 5/1986 |
| EP | 0 181 745 A2 | 5/1986 |
| EP | 1 666 314 A1 | 6/2006 |
| GB | 1 570 459 A | 7/1980 |
| JP | 59-192639 A | 11/1984 |

OTHER PUBLICATIONS

International Search Report including partial translation dated Apr. 9, 2009 Fifteen (15) pages.

* cited by examiner

VEHICLE SEAT BELT-OFFERING DEVICE AND THREE-POINT AUTOMATIC BELT

This application is a national stage of PCT International Application No. PCT/EP2008/010327, filed Dec. 5, 2008, which claims priority under 35 U.S.C. §119 to German Patent Application No. 10 2007 062 590.3, filed Dec. 22, 2007, the entire disclosure of which is herein expressly incorporated by reference.

BACKGROUND AND SUMMARY OF THE INVENTION

The invention relates to a belt offering device with a deflectable offering arm for a safety belt in a vehicle, particularly in a two-door vehicle, such as a two-seater. The invention further relates to a three-point automatic belt with such a belt offering device.

German patent document DE 25 57 316 A1 discloses an arrangement of a three-point automatic belt for a front seat in a two-door vehicle having rear seats. A belt reel is thereby arranged in the region of a rigid vehicle side wall. A rotationally mounted carrier bracket is furthermore arranged in the longitudinal vehicle direction at a rigid vehicle part, which bracket receives a fixed point of a hip belt part. When the belt is rolled up completely, an end guided by a loop-around fitting and anchored to the carrier bracket holds the carrier bracket in a front tilt position. When this end is pressed back, the carrier bracket folds into a rear position releasing the boarding to the rear seats.

European patent document EP 0 181 745 A2 further discloses a safety belt adjustment device with an offering arm that is mounted in a rotatable manner for a front seat in a motor vehicle which has rear seats. An end of the safety belt is hereby fastened to a free end of the rotatable offering arm, which can be pivoted by a rotational drive, in particular a linkage. The main part of the rotatable offering arm is arranged in an offset manner, whereby the rotatable offering arm pivots into a position below a door opening inclined to the rear region. A boarding of the rear seats in a motor vehicle is thereby possible without hindrance. In a further position of the rotatably mounted offering arm, it abuts this with an upright position of the front seat. The rotatable offering arm as part of the safety belt is designed in a flexible manner in a central region and adapts to the wearer of the belt.

A further safety belt adjusting device for a two-door motor vehicle having rear seats is known from European patent document EP 0 181 160 A2. The device comprises a offering arm that can be rotated via a rotational drive, in particular a linkage, which can be pivoted in the direction of a rear region when the door is opened, and into an opposite direction when the door is closed. In the upright position of a backrest of a front seat, the rotatable offering arm abuts along the backrest. When the backrest is inclined to the front, the rotatable offering arm pivots below a door opening region, whereby a boarding to the rear seats is freed.

One object of the invention is to provide an improved belt offering device for a safety belt in a vehicle.

A further object of the invention is to provide a three-point automatic belt with improved boarding and exit possibilities and improved operating and wear comfort.

These and other objects and advantages are achieved by the belt offering device according to the invention, in particular a three-point automatic belt in a vehicle, which comprises a belt reel, onto which a belt strap can be rolled. The belt reel is fastened to a fixed vehicle part, and the belt strap is held at the end opposite the belt reel by an offering arm mounted in a pivotal manner at a pivot point of a seat or B pillar. It can be inserted into a belt buckle with a belt buckle part arranged at a fastening point in the draw-out region in the drawn-out state. According to the invention, a belt strap part of the at least partially rollable belt strap forms the offering arm mounted in a rotatable manner.

By the arrangement of the deflectable offering arm as a belt strap part of the belt strap, the number of components for realizing a deflectable offering arm is reduced considerably, whereby a simple construction of the belt offering device is given. Furthermore, such a belt offering device can be assembled in a simple manner and requires less installation space. Due to this, the belt offering device can be produced and mounted with less effort and is thus cost-effective.

The offering arm that can be deflected via the pivot point is preferably designed as a partially stiffened belt strap part of the belt strap from the pivot point in one plane. The belt strap part is preferably formed stiffened from the pivot point of for example about 20 cm in the longitudinal extension of the belt, and thus forms a lower stiff belt surface extending from the pivot point. The length of the stiffened belt strap part can thereby be given out freely. The length of the stiffened belt strap part can in particular be preset in dependence on the vehicle type, the arrangement and adjustability of the vehicle seat. Such an embodiment of the offering arm without additional components as a stiffened element of the belt strap itself represents a solution that can be produced and mounted in a particularly simple manner and which is cost-efficient.

For achieving a good wear comfort, the belt strap part is flexible at least in sections normal to the belt surface and is completely stiffened in the width extension and formed in a largely stiff manner against the direction of the belt buckle. That is, the belt strap part forming the offering arm is formed in a flexible manner normal to the belt surface and thus in the withdrawal direction, in particular in the direction of the belt buckle, and is formed in a stiffened manner in the width and thus in the pivot direction of the pivotal offering arm and against the direction of the belt buckle. The offering arm can hereby be pivoted in a simple and safe manner and adapts well to the belt wearer.

A possible embodiment provides to form the belt strap part forming the offering arm of a number of stiffened lamellae, in particular plastic lamellae. Depending on the embodiment, the plastic lamellae can be applied to the belt strap, in particular sprayed. The plastic lamellae are thereby applied on the side of the belt strap turned away from the body of the belt wearer. Alternatively, the plastic lamellae themselves can form the belt strap part or be introduced into a flexible, in particular textile belt strap. The lamellae are thereby especially formed by a rigid polymeric plastics, e.g., a thermoplastic resin, in particular polyethylene.

The plastic lamellae conveniently have different lengths in the longitudinal extension of the belt strap. In particular, the first plastic lamella arranged at the side of the pivot point has a larger length than the other plastic lamellae. A safe pivoting and moving of the offering arm is enabled hereby. The further plastic lamellae arranged on the opposite side of the pivot point have for example a largely short length, whereby these abut the belt wearer in a simple manner especially in the hip region with a flexible connection with each other when the belt is completely tensioned, rolled out and applied.

In a further embodiment, the last plastic lamella of the belt strap part of the belt strap part arranged at the side opposite of the pivot point has a chamfered closure edge. This enables a simple and safe guidance and a safe position of the belt strap.

For the flexible design of the belt strap in the direction of the normal of the belt surface, the plastic lamellae are connected to each other in a flexible manner in a simple embodiment. The flexible connection with the plastic lamellae sprayed onto the belt strap is for example formed by the in particular textile belt strap. Every other suitable flexible connection can also be provided. The plastic lamellae can for example be designed in the manner of a chain of stiff chain members with flexible chain connections.

The stiffened belt strap part preferably deflects into a forward end position which can be comfortably gripped by the vehicle occupant, in particular pivoting or tilting position. A rotation of the upper body or a rotation of the shoulder region of the vehicle occupant is thereby avoided in a safe manner when gripping and applying the belt.

The stiffened belt strap part preferably deflects into the forward end position that can be gripped in a simple manner when occupying the seat and/or when an ignition key is inserted and/or via a door contact switch, which senses a closing of the corresponding vehicle door via electrical contacts and/or sensors, possibly in a time-controlled manner. By the deflection of the stiffened belt strap part into the forward grippable end position, the vehicle occupant is preferably animated to apply the belt. The deflection of the belt strap part forming the offering arm can thereby take place in a time-controlled manner. A deflection of the belt strap part which is too early (the vehicle occupant has not yet taken up the place) or too late (the vehicle occupant sits and the vehicle is already driving) can be avoided.

In a possible embodiment, the deflection mechanism is coupled to a seat occupation recognition, for example in a mechanical or electronic manner. The seat occupation recognition can thereby for example be a pressure or acceleration sensor integrated into the seat surface, which safely identifies a seat occupation by the penetration depth that can be determined.

The stiffened belt strap part can furthermore be deflected in such a manner that an unimpeded boarding of the seat is possible. The belt strap part hereby deflects into an intermediate or boarding position. In the boarding position of the three-point automatic belt, a backrest of the seat is for example positioned in an upright manner. The offering arm is also positioned in a vertical position, so that the belt strap proceeds vertical to a large extent from the pivot point in the direction of the belt roller or the deflection point.

For unimpeded entry or access for example to a storage compartment behind the seat and/or to a rear space and/or to the rear seat, the belt strap part mounted in a rotatable manner deflects into a rearward end position in dependence on a backrest folded forwards, for example in a position below the opening region of a vehicle door, wherein the offering arm is in one plane with the seat surface.

In a further development of the invention, a belt buckle part formed for example as a buckle tongue is arranged lying on the stiffened belt strap part, which can be guided into a belt buckle and engaged therein when the belt is applied. An additional stopper usually provided in the belt strap can hereby be omitted.

The offering arm can conveniently be pivoted in an electromotive driven manner. The electromotive drive is for example designed as a linear drive and/or a rotational drive. The offering arm is formed as a deflectable or rotatable offering arm in a possible embodiment and is for example fixed at the seat itself via the pivot point forming the rotational axis or at the lower region of the fixed vehicle part or the B pillar and mounted in a rotatable manner.

Depending on the embodiment of the drive, the belt strap part formed as an offering arm can additionally be arranged for the deflection at the seat in a linear movable manner or at the lower region of the fixed vehicle part. The deflectable offering arm can thereby be arranged in a manner that is movable to and fro in one direction, in particular in the longitudinal direction of the vehicle or of the vehicle seat.

The electromotive drive for deflecting the stiffened belt strap part is preferably formed as a linear and/or as a rotary drive depending on the design and executing movement.

Other objects, advantages and novel features of the present invention will become apparent from the following detailed description of the invention when considered in conjunction with the accompanying drawings.

DETAILED DESCRIPTION OF THE DRAWINGS

Figure 1A:
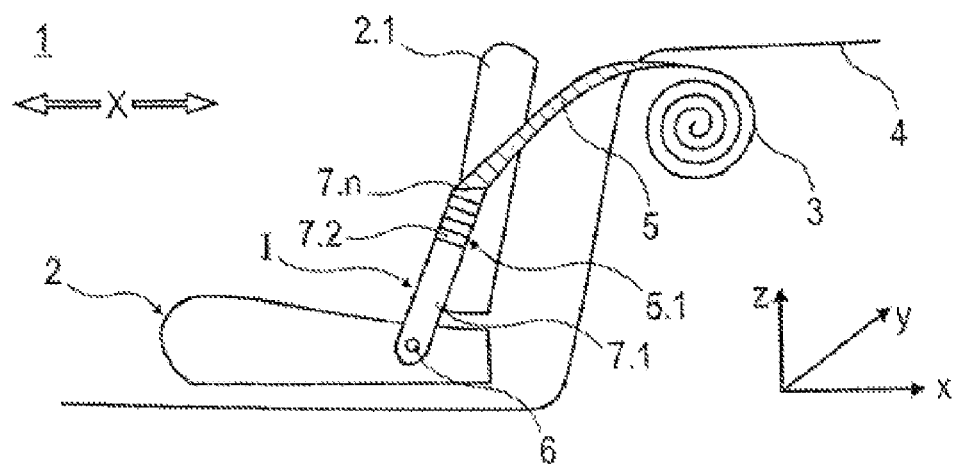
FIGS. 1A and 1B show schematically a three-point automatic belt with a stiffened belt strap part in an intermediate or boarding position.

Parts corresponding to each other are provided with the same reference numerals in all figures.

Figure 1B:
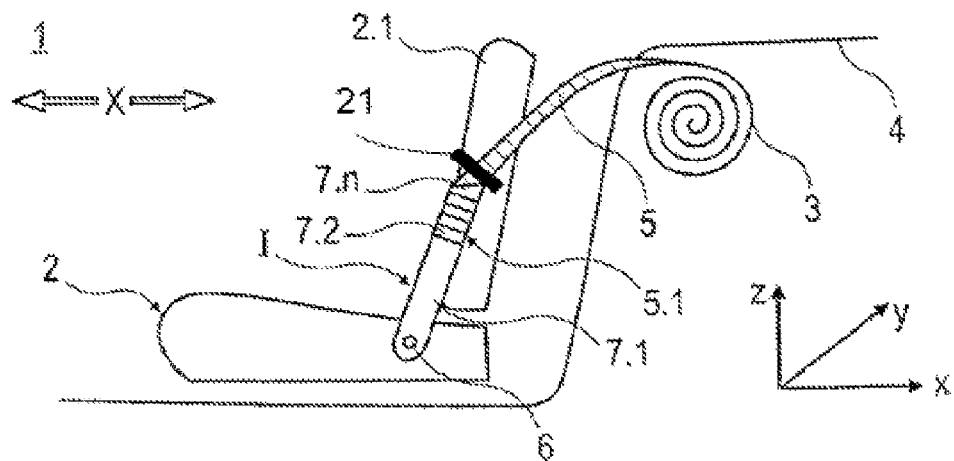

FIGS. 1A and 1B show a three-point automatic belt 1 (hereinafter referred to simply as belt 1) for a seat 2 in a vehicle (not shown in detail), with a belt offering device according to the invention. The belt 1 comprises a belt reel 3, which is for example arranged in an upper region at a fixed vehicle part 4 of a vehicle body for example covered by means of a veneer. A belt strap 5 can be rolled onto the belt reel 3. The belt strap 5 is arranged and fastened to a further point, a pivot point 6 for example at a lower region of the vehicle part 4 of the vehicle body or at the seat 2 or at the B pillar. As illustrated in FIG. 1B, a buckle tongue 21 is arranged resting on the second end of the belt strap 5.

Alternatively, a floor section of the vehicle or another suitable vehicle part can be chosen as a possible fastening point for the fastening.

Figure 8A:
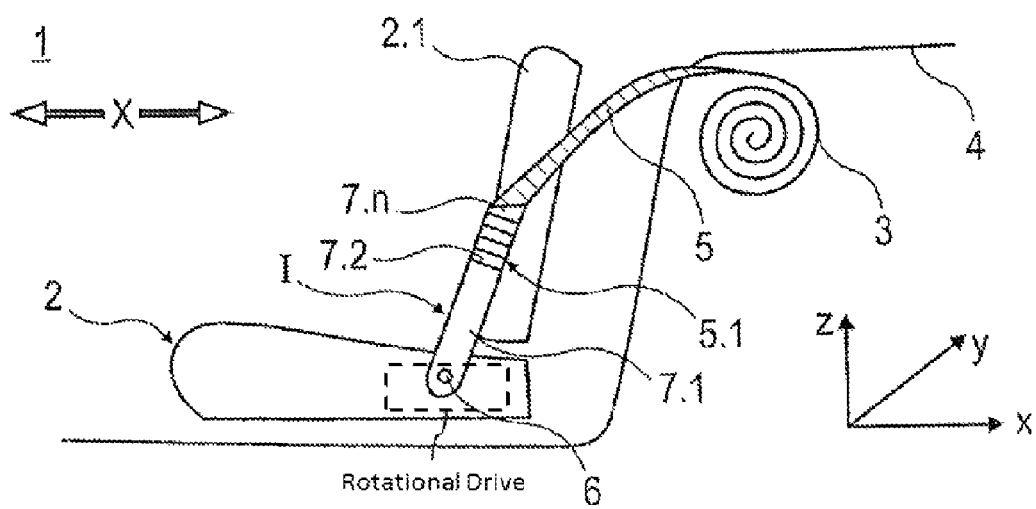
FIGS. 8A and 8B show schematically a three-point automatic belt with a stiffened belt strap part in an intermediate or boarding position with a rotational drive and linear drive, respectively.
Figure 8B:
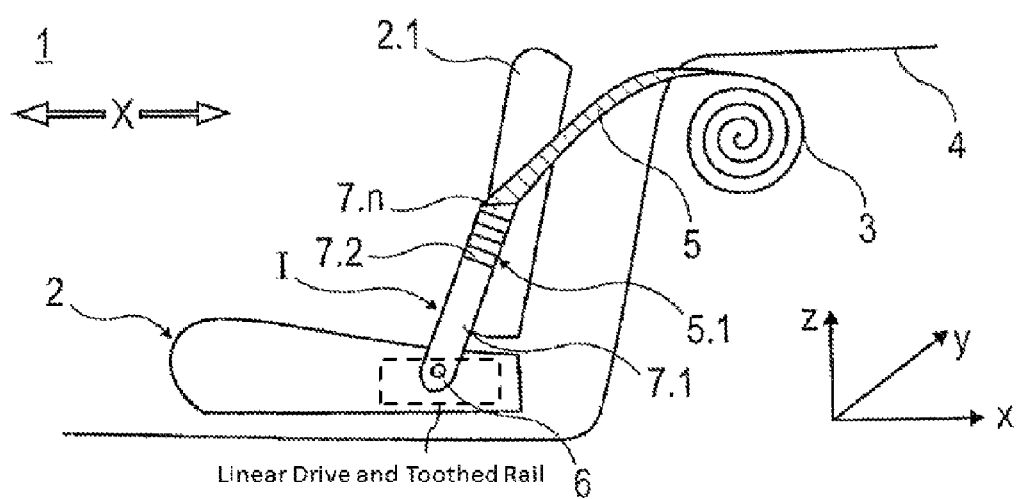

The belt 1 can advantageously be displaced via the pivot point 6 by means of an electromotive or mechanical actuated deflection or displacement mechanism for example in the form of a rotary or linear drive from below to above and vice versa in the xy plane in a rotational/pivotal manner or from the front to the rear and vice versa in the xy plane. The rotational and/or linear drive can for example be arranged in a recess in the seat 2 or below the seat 2. The rotational axis of the belt 1 in the pivot point 6 is thereby for example parallel to the axis of a backrest adjustment. The rotational drive is schematically illustrated in FIG. 8A and the linear drive is schematically illustrated in FIG. 8B.

For the linear movement of the pivot point 6 of the belt 1, a toothed rail is for example arranged in a covered manner at or in the seat 2, by means of which the belt can be moved to and fro in the x-direction into a respective position.

Figure 3B:
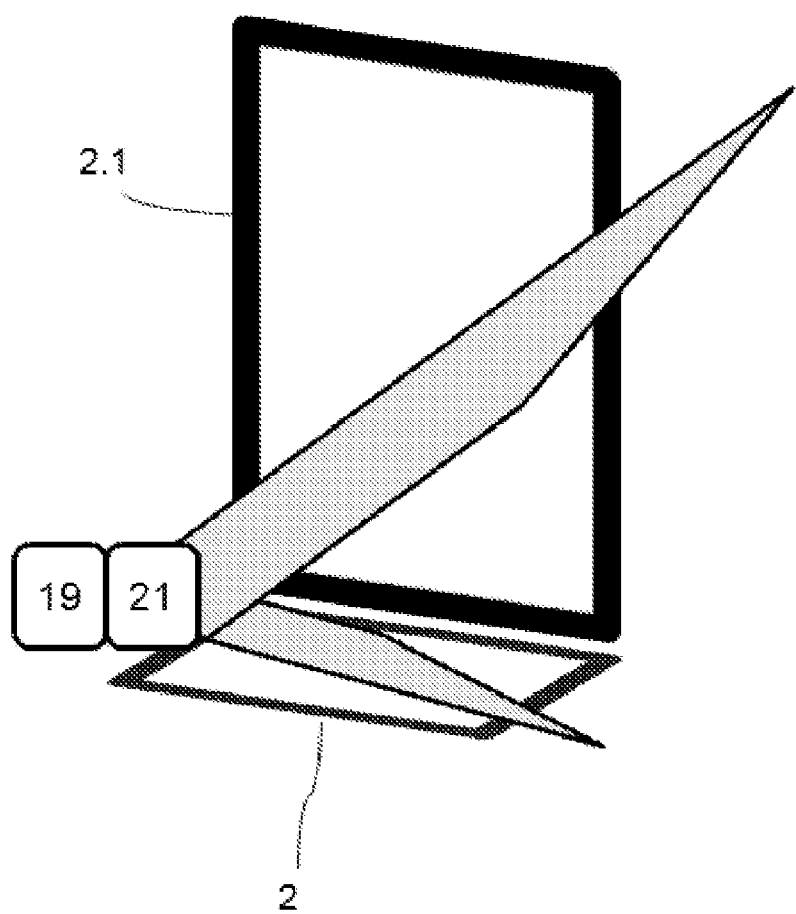

A third connection point 15 of the belt 1 is provided in a manner shown in FIG. 3B at a belt buckle 19 arranged on the opposite side of the seat 2, in which engages a belt buckle part 21 in the completely tensioned state of the belt 1 and when applying it.

The belt strap 5 is formed in a stiffened manner from the fastening and pivot point 6 in the xy plane, in particular in dependence on the connection point by a corresponding length, for example about 20 cm, and is designed as a deflectable offering arm. The belt strap part 5.1 stiffened as a deflectable offering arm is formed flexible in the direction of the normal of the belt surface and thus in the y direction (in the withdrawal direction). That is, when applying the belt strap 5, it abuts the hip region of the belt wearer in a flexible manner. The belt strap part 5.1 is stiffened in the opposite direction (=−y direction).

When opening an associated vehicle door, not shown in detail, the three-point automatic belt 1 is positioned in a starting position in particular of a boarding position I. The offering arm is thereby pivoted in a vertical or upright position (in the z direction), so that the belt strap 5 proceeds from the pivot point 6 vertically to a large extent along the backrest 2.1 of the seat and behind this in the direction of the belt reel 3. The backrest 2.1 is positioned in an upright manner. A buckle tongue 21 (shown in FIGS. 1B, 2B, and 6B), which can be guided and engaged into a belt buckle 19 when putting on the belt strap 5, is advantageously on the upper end of the stiffened belt strap part 5.1 in this position.

Figure 2A:
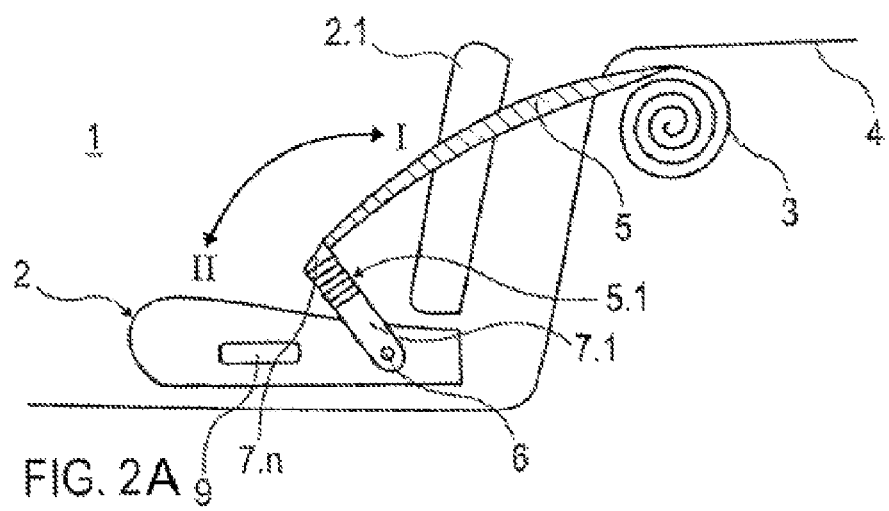
FIGS. 2A and 2B show an end position of a deflection of the stiffened belt strap part of the three-point automatic belt.
Figure 2B:
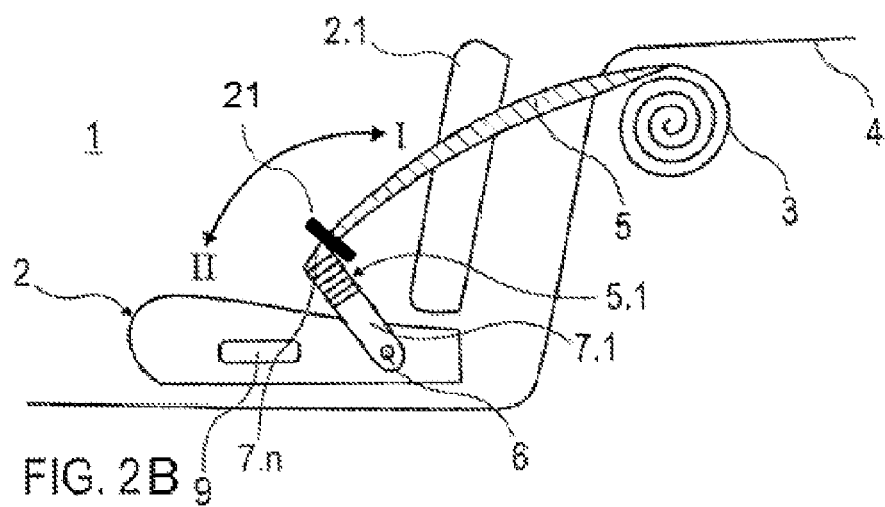
Figure 3A:
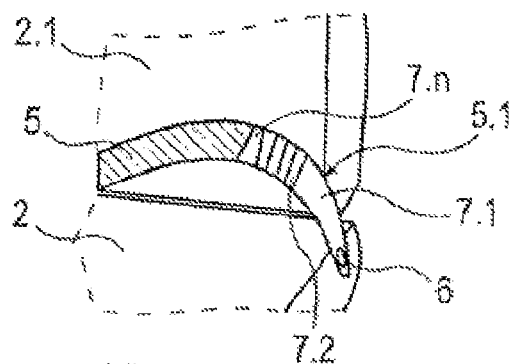
FIGS. 3A and 3B schematically a section of a seat with an offering arm designed as a stiffened belt strap part.
Figure 4:
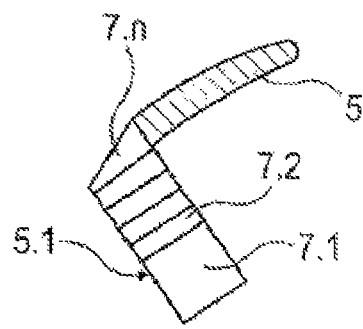
FIG. 4 is a schematic depiction of a section of a belt strap with a stiffened belt strap part.

In FIGS. 2A and 2B, the three-point automatic belt 1 is positioned in an operating position, in particular an end position II of the three-point automatic belt 1. For this, the offering arm can for example be pivoted for example after a closing of the associated vehicle door, not shown in detail, into the end position II, as described in more detail in the following.

After the closing of the vehicle door, the belt reel 3 is unlocked by means of a corresponding mechanism, so that the belt strap 5 can be uncoiled. The closing of the vehicle door can for example be sensed by a door contact. The stiffened belt strap part 5.1 and therewith the overlying buckle tongue preferably pivot into the forward end position II in a time-controlled manner after a presentable time, whereby the buckle tongue can be gripped by a vehicle occupant above a hip region in an advantageous manner without a shoulder rotation.

Additionally or alternatively, the electromotive or mechanically actuated deflection of the stiffened belt strap part 5.1 can be activated when the seat 2 is occupied by a vehicle occupant and/or when an ignition key is introduced into an ignition switch. For identifying for example the occupation of the seat 2, at least one sensor 9 (=seat occupation sensor), e.g., a pressure or acceleration sensor can be integrated, which senses the depth of penetration and resulting therefrom a seat occupation. This sensor 9 is conveniently for example coupled to the drive mechanically or electronically for deflecting the stiffened belt strap part 5.1.

After opening the belt buckle and taking out the buckle tongue from the belt buckle and thus with the removal of the belt 1, the belt reel 3 draws in the belt strap 5 and the stiffened belt strap part 5.1 pivots into the boarding position I as described in FIGS. 1A and 1B. The vehicle occupant can stand up from the seat 2 without hindrance and can exit for example.

The stiffened deflection or belt strap part 5.1 is shown in more detail in FIGS. 3A, 3B, 4, and 5. From the fastening and deflection point 6, the belt strap 5 is, as described in FIGS. 1A and 1B formed stiffened for example 20 or 30 cm in the longitudinal extension. The stiffened belt strap part 5.1 is thereby formed in a stiffened manner in the width and thus in the pivot direction x, xy direction, so that a simple and safe pivoting is enabled. On the other hand, the belt strap 5 is designed in a flexible manner in the region of the stiffened belt strap part 5.1 in the direction of the normal of the belt surface (=y direction). The stiffened belt strap part 5.1 is designed in a stiffened manner in the opposite y direction (=−y).

The stiffening of the belt strap part 5.1 can for example be realized by spraying on a number of lamellae, in particular plastic lamellae 7.1 to 7.*n* onto the in particular textile belt strap 5. The flexible formation of the belt strap part 5.1 is especially achieved by a flexible connection of the plastic lamellae 7.1 to 7.*n*.

For a simple deflection of the offering arm, the first plastic lamella 7.1 arranged in the region of the pivot point 6 has a larger length than the following plastic lamellae 7.2 to 7.*n*. The length of the first plastic lamella 7.1 is thereby determined in a definitive manner by the measurements of the seat 2. The length is in particular chosen in such a manner that the offering arm largely ends in a plane with the seat surface in the tensioned state of the belt 1. Above the first plastic lamella 7.1, the belt strap 5 has further plastic lamellae 7.2 to 7.*n*, which are particularly small, have for example a length of 2 cm, whereby the flexibility of the stiffened belt strap part 5.1 in the direction of the normal of the belt surface (y direction or in the direction of the hip of the occupant) is ensured.

The last plastic lamella 7.*n* delimiting the stiffened region of the belt strap part 5.1 are preferably formed in a chamfered manner, whereby a folding and/or twisting of the belt strap 5 is avoided. The last delimiting plastic lamella 7.*n* preferably carries the buckle tongue.

Figure 5:
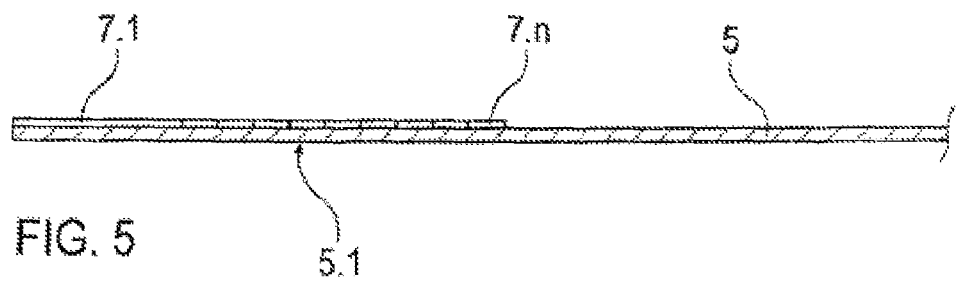
FIG. 5 shows schematically a longitudinal section of the belt strap in the stiffened region.

FIG. 5 shows an embodiment for the plastic lamellae 7.1 to 7.*n* applied to the belt strap 5 in the belt strap part 5.1. The plastic lamellae 7.1 to 7.*n* are thereby applied to the side of the belt strap 5 on the side facing away from the body of the belt wearer.

The plastic lamellae 7.1 to 7.*n* can thereby be sprayed onto the belt strap 5 or applied in another suitable manner. The plastic lamellae 7.1 to 7.*n* can alternatively form the belt strap part 5.1 itself or can be introduced into a flexible, in particular textile belt strap. The lamellae 7.1 to 7.*n* are thereby especially formed by a rigid polymeric plastic, e.g., a thermoplastic resin, such as polyethylene.

For the flexible design of the stiffened belt strap part 5.1 in the direction of the normal of the belt surface, the plastic lamellae 7.1 to 7.*n* are connected to each other in a simple embodiment in a flexible manner. The flexible connection is for example formed by the textile belt strap 5 with the plastic lamellae 7.1 to 7.*n* sprayed onto the belt strap 5. Any other suitable flexible connection can also be provided.

Figure 6A:
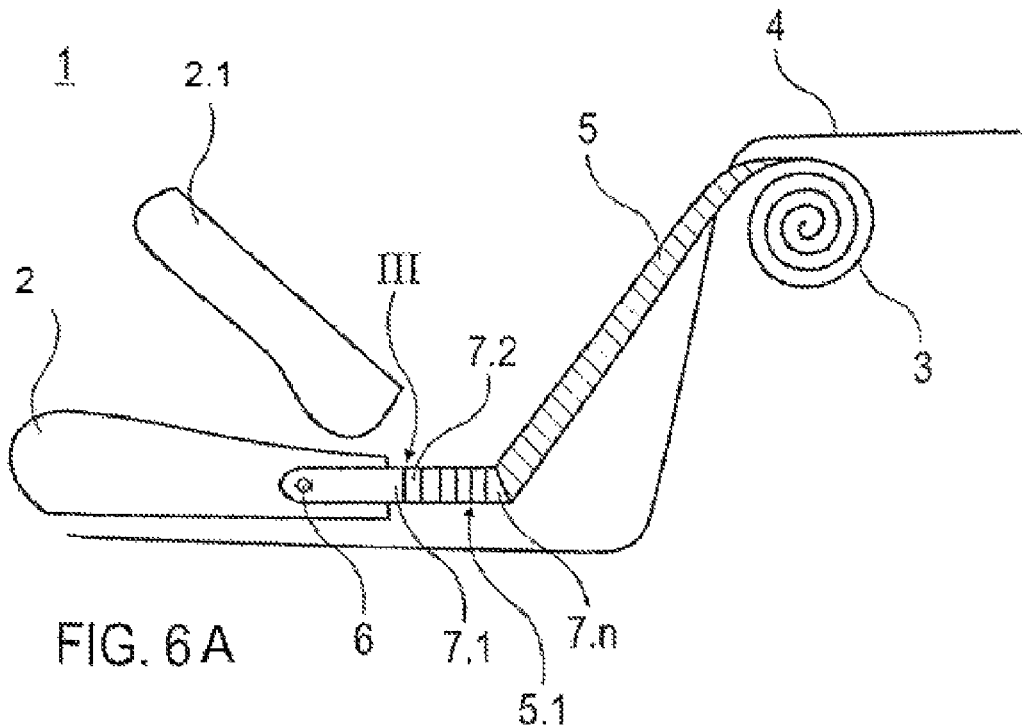
FIGS. 6A and 6B show a further end position of the three-point automatic belt with stiffened belt strap part.
Figure 6B:
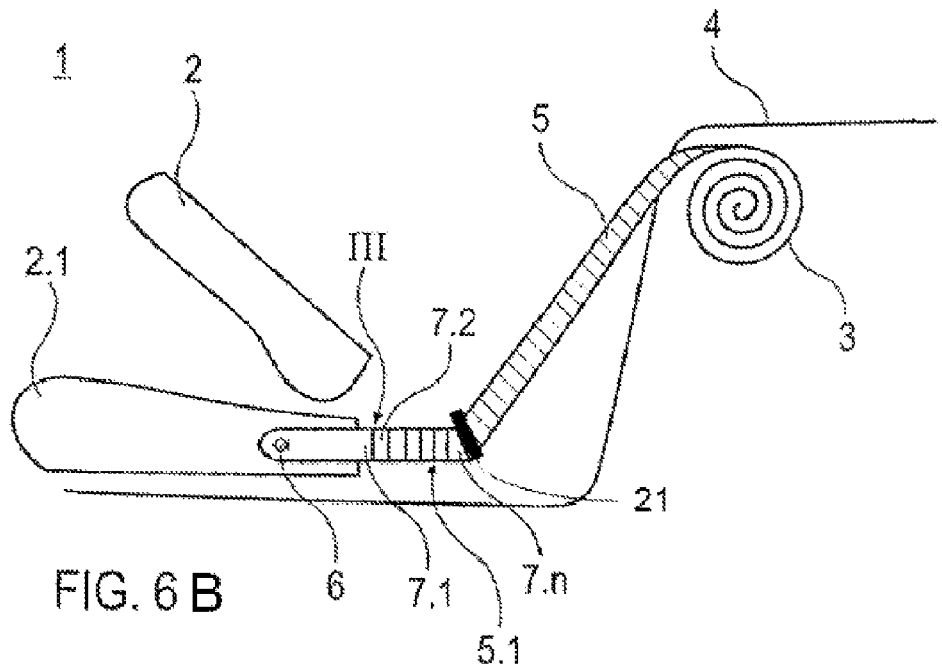

A further end position III of the belt 1 is shown in FIGS. 6A and 6B. The stiffened belt strap part 5.1 hereby deflects into a rearward position, the end position III in dependence on a position of the backrest 2.1. If the backrest 2.1 of the seat 2, as shown in FIGS. 6A and 6B, is folded forward, the deflection mechanism of the stiffened belt strap part 5.1 is activated by the inclination of the backrest 2.1 and the stiffened belt strap part 5.1 pivots into the rearward end position III into a region below the door opening. An entry or an access to a storage compartment behind the seat or to a rear space and/or to the rear seat is thereby possible without hindrance. This pivoting into a third end position III is in particular provided with a use of the belt 1 for a convertible or a two-door vehicle.

Alternatively or additionally, the offering arm can be moved and forth in a linear manner by a linear drive in the x direction.

Figure 7:
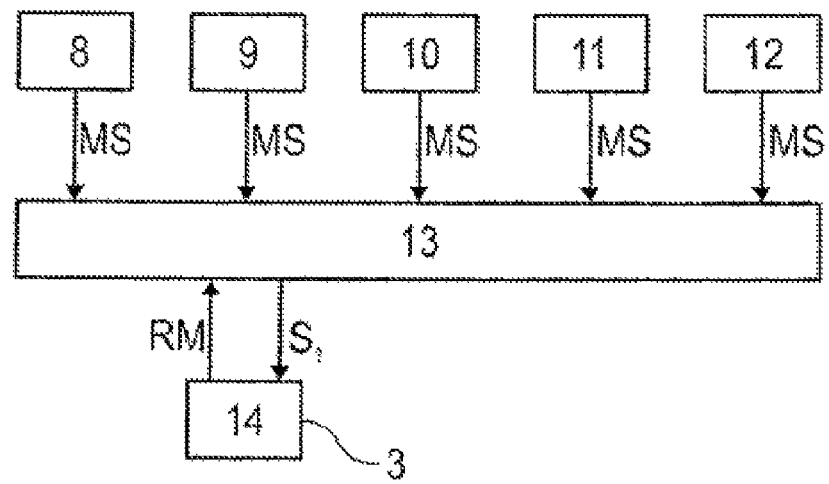
FIG. 7 shows schematically a block diagram for controlling an electromotive drive of the three-point automatic belt.

In FIG. 7 is shown a block diagram of a possible control of the deflection and/or displacement of the stiffened belt strap part 5.1. For this, corresponding sensors 8 to 12 are arranged in the vehicle for example at the vehicle door and/or at the buckle tongue and/or for sensing a seat occupancy and/or for sensing an ignition key introduced into an ignition switch.

As described in FIG. 1, the stiffened belt strap part 5.1 is in the boarding position I as a starting position.

If corresponding signals MS are sensed by a door contact sensor 8 and/or a seat occupancy sensor 9 and/or a position sensor 10 in the ignition switch, these status signals MS can be guided to a control unit 13. By a control signal $S_1$ generated by the control unit 13, which can for example be guided to a locking device 14 for the deflection mechanism, the electromotive drive, the locking device 14 decouples (for example, after a presettable time $t_1$) disposed in the control 13. After the decoupling of the locking device 14, which can be guided to the control unit 13 as a feedback signal RM, the stiffened belt strap part 5.1 deflects into the forward end position II after a presettable time $t_2$. The vehicle occupant applies the belt 1 and guides the buckle tongue into the belt buckle, which engages there and can be sensed by a buckle sensor 11 arranged there.

When the belt 1 is removed, the buckle tongue is guided out of the belt buckle. The guiding out can be sensed via the buckle sensor arranged in the belt buckle and can be guided to the control unit 13 as a status signal MS, whereafter the deflecting mechanism and thus the electromotive drive is again activated and deflects the stiffened belt strap part 5.1 back into the boarding position I, whereby the belt strap 5 is withdrawn and rolled onto the belt reel 3, and the vehicle occupant can exit in a comfortable manner.

A further sensor 12 is for example arranged at the backrest 2.1. If the backrest is folded forwards, the sensor 12 senses this position and transmits a status signal MS to the control unit 13. A signal $S_1$ generated by the control unit 13 releases the electromotive drive and the stiffened belt strap part 5.1 pivots into the rearward end position III. If the backrest 2.1 positioned in an upright manner, the stiffened belt strap part 5.1 automatically deflects into the boarding position I.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A belt offering device for a three-point automatic belt in a vehicle, said belt offering device comprising:
    a belt reel fastened to a fixed vehicle part; and
    a belt strap having a first end that is connected to the belt reel so that the belt strap can be rolled onto the belt reel and can be unrolled from the belt reel in a withdrawn state,
    wherein a second end of the belt strap, which is opposite of the first end, forms an offering arm pivotably mounted, at a pivot point, to one of a vehicle seat and a vehicle B pillar,
    wherein the belt strap carries a belt buckle part that is insertable into a belt buckle arranged at a fastening point, and
    wherein an outer surface of the second end of the belt strap forming the offering arm comprises a number of stiffened plastic lamellae.

2. A belt-offering device according to claim 1, wherein the second end of the belt strap forming the offering arm has a length of at least 20 cm.

3. A belt-offering device according to claim 1, wherein the second end of the belt strap forming the offering arm is formed so that, at least in some sections, the second end of the belt strap is flexible, in a direction normal to the outer surface of the belt strap.

4. A belt-offering device according to claim 1, wherein the plastic lamellae have different lengths in a longitudinal extension of the belt strap.

5. A belt-offering device according to claim 1, wherein the plastic lamella arranged closest to the pivot point has a larger length than the other plastic lamellae.

6. A belt-offering device according to claim 1, wherein the plastic lamella on the second end of the belt strap furthest from the pivot point has an inclined closure edge.

7. A belt-offering device according to claim 1, wherein the plastic lamellae are connected to each other in a flexible manner.

8. A belt-offering device according to claim 1, wherein the second end of the belt strap forming the offering arm can be pivoted into a forward end position that can be reached by a vehicle occupant.

9. A belt-offering device according to claim 1, wherein the second end of the belt strap forming the offering arm can be pivoted automatically into a forward end position that can be reached by a vehicle occupant when one of the following conditions exists:
    the seat is occupied;
    an ignition key is introduced into an ignition switch; and
    actuation of a door contact switch after a presettable time.

10. A belt-offering device according to claim 1, wherein the second end of the belt strap forming the offering arm can be pivoted into a boarding position that facilitates boarding of the seat.

11. A belt-offering device according to claim 1, wherein the second end of the belt strap forming the offering arm can be pivoted to a rearward end position when a backrest of the seat is folded forwards.

12. A belt-offering device according to claim 1, wherein a buckle tongue is arranged resting on the second end of the belt strap forming the offering arm.

13. A belt-offering device according to claim 1, wherein the offering arm can be pivoted by an electromotive or mechanical drive.

14. A belt-offering device according to claim 13, wherein an electromotive drive is designed as one of a linear drive and a rotational drive.

15. A three-point automatic belt with a belt-offering device according to claim 1.

* * * * *